(12) United States Patent
Kim

(10) Patent No.: US 11,340,495 B2
(45) Date of Patent: May 24, 2022

(54) LED BACKLIGHT CASE

(71) Applicant: Samsung Electronics Co., Ltd., Suwon-si (KR)

(72) Inventor: Yoonyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/250,511

(22) PCT Filed: Jun. 4, 2019

(86) PCT No.: PCT/KR2019/006735
§ 371 (c)(1),
(2) Date: Jan. 29, 2021

(87) PCT Pub. No.: WO2020/027419
PCT Pub. Date: Feb. 6, 2020

(65) Prior Publication Data
US 2021/0311360 A1    Oct. 7, 2021

(30) Foreign Application Priority Data
Jul. 30, 2018   (KR) .......................... 10-2018-0088795

(51) Int. Cl.
*G02F 1/13357*     (2006.01)
*H04B 1/3888*      (2015.01)
*H04M 1/02*        (2006.01)

(52) U.S. Cl.
CPC ..... *G02F 1/133603* (2013.01); *H04B 1/3888* (2013.01); *H04M 1/0283* (2013.01)

(58) Field of Classification Search
None
See application file for complete search history.

(56) References Cited

U.S. PATENT DOCUMENTS

| | | | |
|---|---|---|---|
| 5,443,906 A | 8/1995 | Pihl et al. | |
| 9,883,583 B2* | 1/2018 | Cousins | H05K 3/10 |
| 10,400,364 B1* | 9/2019 | Mayer | D02G 3/441 |

(Continued)

FOREIGN PATENT DOCUMENTS

| | | |
|---|---|---|
| KR | 20-0440109 Y1 | 5/2008 |
| KR | 10-1333624 B1 | 11/2013 |
| KR | 10-2015-0133423 A | 11/2015 |

OTHER PUBLICATIONS

International Search Report dated Sep. 11, 2019 in connection with International Patent Application No. PCT/KR2019/006735, 3 pages.

(Continued)

*Primary Examiner* — Britt D Hanley

(57) ABSTRACT

Disclosed is an exterior case. This exterior case comprises: a base including an internal space for storing an electronic device; a circuit board disposed on a first surface of the base and including a plurality of light-emitting elements for emitting light; and a weft-and-warp-woven outer cover surrounding the base and the circuit board and transmitting emitted light, wherein at least one among the weft and the warp may be formed of a thermoplastic polyester elastomer (TPEE) coating yarn which uses a transparent TPEE as a core and includes a coating layer made of polyurethane (PU) and surrounding the core.

15 Claims, 16 Drawing Sheets

(56) References Cited

U.S. PATENT DOCUMENTS

| | | |
|---|---|---|
| 2004/0129333 A1 | 7/2004 | Samel et al. |
| 2004/0211225 A1 | 10/2004 | Dickerson |
| 2006/0133060 A1 | 6/2006 | Estanislao et al. |
| 2009/0305037 A1 | 12/2009 | Tsukada et al. |
| 2013/0076614 A1 | 3/2013 | Ive et al. |
| 2015/0335115 A1 | 11/2015 | Kim |
| 2016/0130393 A1 | 5/2016 | Liao et al. |
| 2016/0356736 A1 | 12/2016 | Nagel et al. |
| 2017/0178840 A1 | 6/2017 | Hegde et al. |

OTHER PUBLICATIONS

Written Opinion of the International Searching Authority dated Sep. 11, 2019 in connection with International Patent Application No. PCT/KR2019/006735, 5 pages.

\* cited by examiner

LED BACKLIGHT CASE

CROSS-REFERENCE TO RELATED APPLICATIONS

This application is a 371 of International Application No. PCT/KR2019/006735 filed on Jun. 4, 2019, which claims priority to Korean Patent Application No. 10-2018-0088795 filed on Jul. 30, 2018, the disclosures of which are herein incorporated by reference in their entirety.

BACKGROUND

1. Field

An exterior case according to various embodiments described below relates to a light emitting diode (LED) backlight case for enhancing an aesthetic impression and a functionality.

2. Description of Related Art

An exterior case may be provided in the form of encasing an exterior of an electronic device to protect the electronic device. The exterior case may be utilized not only as a means for protecting an electronic device, but also as a means for expressing user's personality or a means for complementing use convenience of the electronic device.

The exterior case may be formed with a fabric or various materials in order to express user's personality or to offer exclusiveness of the exterior case. In addition, the exterior case may include its own display panel, or may have a transparent portion to expose a portion of a display of an electronic device, such that the exterior case can be utilized as a means for delivering information to a user.

An exterior case may include a display panel to deliver information. If a surface of such an exterior case is formed with a fabric, the fabric may make it difficult to allow light of the display panel to pass therethrough. Accordingly, there is a demand for a method for transmitting light of a display panel in an exterior case having a surface formed with a fabric.

The technical object to be achieved by the disclosure is not limited to that mentioned above, and other technical objects that are not mentioned above may be clearly understood to those skilled in the art based on the description provided below.

SUMMARY

An exterior case according to various embodiments may include: a base including an inner space to receive an electronic device; a circuit board disposed on a first surface of the base and including a plurality of light emitting elements to emit light; and an outer skin configured to cover the base and the circuit board, and woven with wefts and warps allowing the emitted light to pass therethrough. At least one of the weft and the warp may be formed with a thermoplastic polyester elastomer (TPEE) coating thread including a core formed with a transparent TPEE and a coating layer formed with polyurethane (PU) and surrounding the core.

According to various embodiments, an exterior case may include: a base having a space to receive an electronic device; a cover disposed to be rotatable about one corner of the base to open and close a front surface of the electronic device; a plurality of light emitting elements disposed on an outer surface of the cover to emit light; a circuit board electrically connected with the plurality of light emitting elements and disposed on the base; and an outer skin configured to cover the base and the cover, such that one edge of the base and one edge of the cover are disposed adjacent to each other, and woven with wefts and warps allowing the emitted light to pass therethrough. At least one of the weft and the warp may be formed with a TPEE coating thread including a core formed with a transparent TPEE and a coating layer formed with PU and surrounding the core.

According to various embodiments, an outer skin formed with a fabric allowing light to pass therethrough convers a case, and light emitted from a board including a light emitting diode passes through the fabric and provides information of an electronic device to a user.

The effect achieved by the disclosure is not limited to that mentioned above, and other effects that are not mentioned above may be clearly understood to those skilled in the art based on the description provided below.

DETAILED DESCRIPTION

Figure 1:
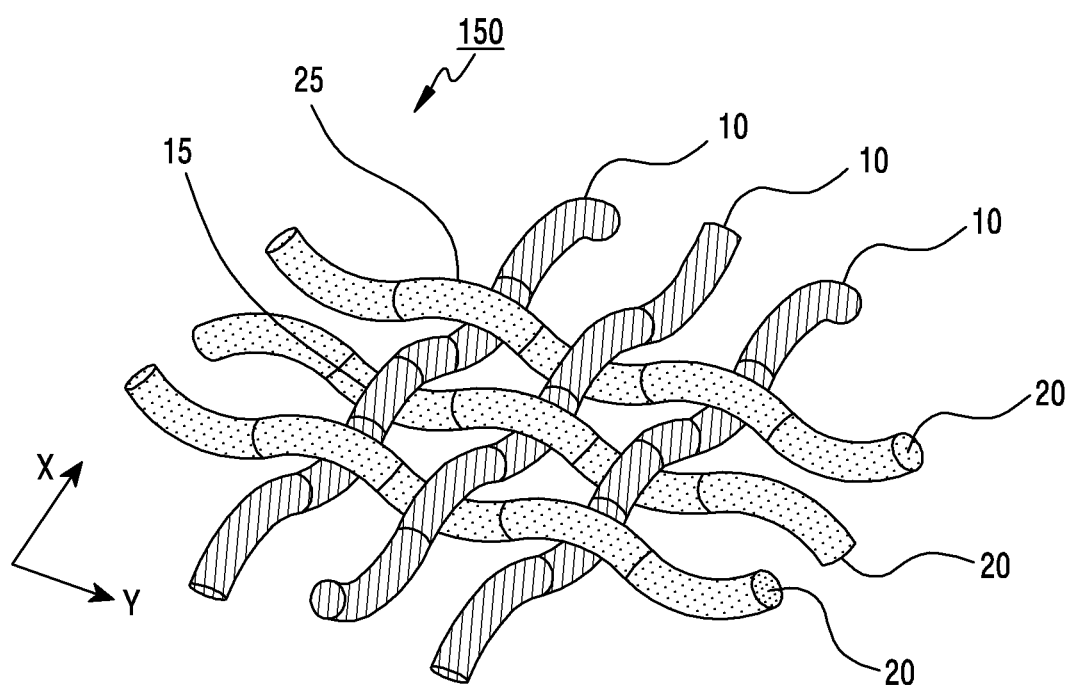
FIG. 1 is a schematic view illustrating a woven structure of a fabric forming an outer skin of an exterior case according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a schematic view illustrating a woven structure of a fabric forming an outer skin of an exterior case according to various embodiments.

Referring to FIG. 1, the fabric forming the outer skin 150 may include wefts 10 and warps 20. The outer skin 150 may be formed by a weaving operation which fixes the warps 20 and passes the wefts 10 across the warps 20 in the perpendicular direction to the warps 20.

The weaving operation may include a method of fabricating the outer skin 150 by performing a warp tying operation for making the warps 20 tightened, and then, by selecting the wefts 10 and crossing the wefts 10 and the warps 20 over and under each other in the perpendicular direction. Although it is illustrated that every threads of the wefts 10 and the warps 20 are crossed over and under each other repeatedly, the outer skin 150 may be woven by repeatedly crossing a predetermined number of wefts 10 and warps 20 over and under each other. By doing so, a pattern of the outer skin 150 may be expressed variously.

A color of the wefts 10 or warps 20 may be selected according to a color of the outer skin to be expressed.

According to various embodiments, one color may be selected as the color of the warps 20, and a color of the wefts 10 may be selected based on a color of the outer skin 150 visually recognized. To the contrary, one color may be selected as the color of the wefts 10, and a color of the outer skin 150 may be selected by selecting the color of the wefts 10.

Various colors may be selected as colors of the wefts 10 or colors of the warps 20, and the outer skin 150 may have various colors in a predetermined area.

According to various embodiments, one color may be selected as the color of the warps 20, and various colors may be selected as colors of the wefts 10. According to selected colors of the wefts 10, the outer skin 150 may have various colors in a predetermined area. When the color of the outer skin 150 is selected based on the color of the warps 20, the warp tying operation may be required to replace the color. However, if the color of the outer skin 150 is selected based on the color of the wefts 10, the color of the outer skin 150 may be selected by selecting the wefts 10 without the warp tying operation.

According to various embodiments, one color may be selected as the color of the warps 20 and a color intensity of the wefts 10 may vary in a predetermined area. The color intensity of the wefts 10 may gradually increase or decrease in the predetermined area. The outer skin 150 may have a predetermined area in which a gradation effect is implemented, by adjusting the color intensity of the wefts 10. The color intensity of the wefts 10 may be adjusted by preparing wefts 10 of various tones. The outer skin 150 may implement a gradation effect in a predetermined area by adjusting the color intensity of the warps 20.

Figure 2:
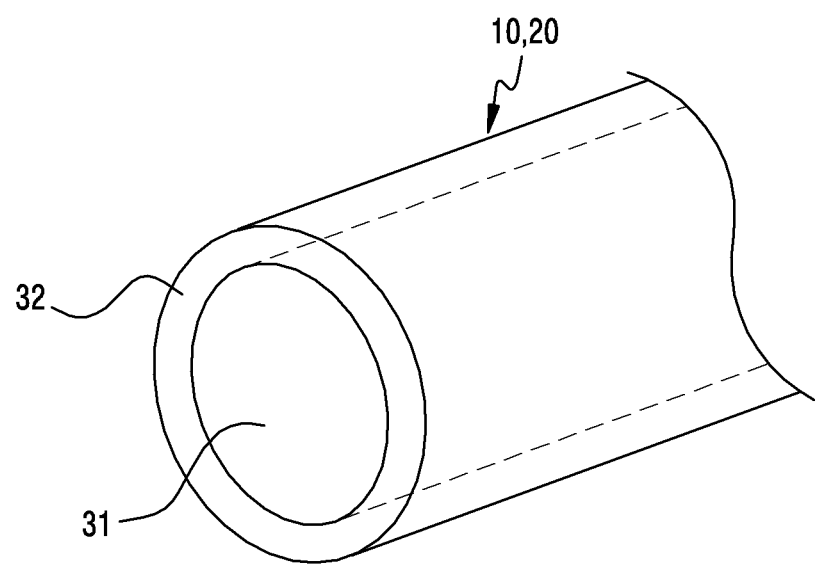
FIG. 2 is a schematic view of a thread forming the fabric of the exterior case according to various embodiments.
Figure 3:
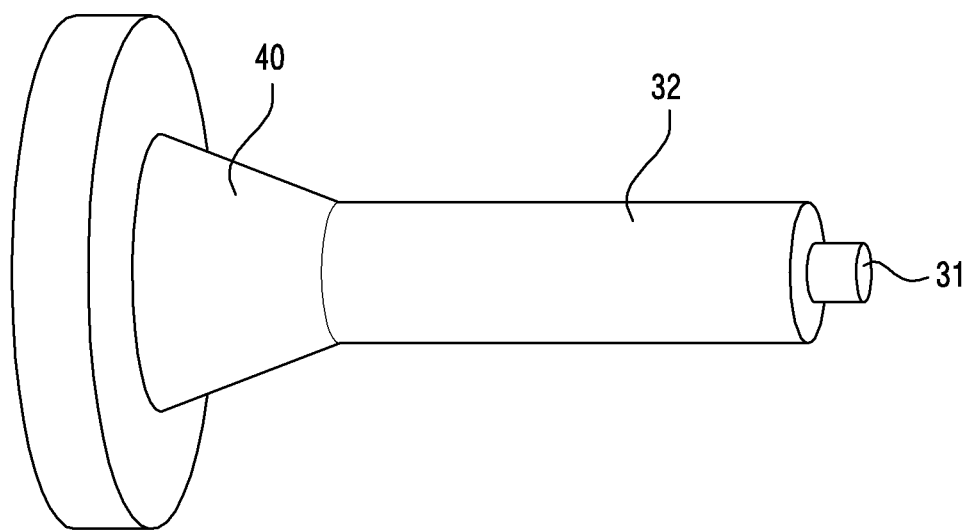
FIG. 3 is a schematic view illustrating a coating deice for fabricating the thread of FIG. 2.

FIG. 2 is a schematic view of a thread forming the outer skin of the exterior case according to various embodiments, and FIG. 3 is a schematic view illustrating a coating device for fabricating the thread of FIG. 2.

Referring to FIG. 2, the weft 10 and the warp 20 may include a core 31 and a coating layer 32.

The core 31 may be formed with a material that is well stretchable when a tension is applied to both ends. According to various embodiments, the core 31 may be formed with a material that has a high elongation. If the elongation of the core 31 increases, the outer skin 150 can easily encase even an edge portion of an object, and the outer skin 150 and the object can be easily bonded to each other.

According to various embodiments, the core 31 may be formed with a transparent material. The core 31 may allow light to pass therethrough, and, when a light emitting diode is disposed on one surface of the outer skin 150, light of the light emitting diode may pass through the outer skin 150.

According to various embodiments, the weft 10 and the warp 20 may be a thermoplastic polyester elastomer (TPEE). The weft 10 and the warp 20 of the TPEE may be fabricated with a transparent material. The outer skin 150 woven with the weft 10 and the warp 20 having the cores of the TPEE can encase an object irrespective of a shape of the object. Even when a light emitting element is attached to a surface of the object, light emitted from the light emitting element may pass through the outer skin and may be recognized from the outside.

The weft 10 and the warp 20 may have the coating layer 32 surrounding an outer circumference of the core 31. The coating layer 32 may determine colors of the weft 10 and the warp 20. The coating layer 32 may be formed with polyurethane (PU). Colors, metallic texture, gloss of the weft 10 and the warp 20 may be adjusted by adjusting components of the PU. To have the metallic texture, the weft 10 and the warp 20 may be fabricated by mixing PU of the coating layer 32 with pearl powder, metal powder, or etc.

Referring to FIG. 3, the weft 10 and the warp 20 may be fabricated by a coating device 40. The coating device 40 may include a housing 41 having a hollow formed therein, and an injection portion 42 including an operating 43 through which a thread is drawn out.

The housing 41 may store a material for coating the core 31. The housing 41 may include a draw-in portion (not shown) through which the core 31 is drawn in. The core 31 may be drawn out through the opening 43.

The material for coating in the housing 41 may melt at a high temperature, and as the core 31 is drawn out through the opening 43, the coating layer 32 may be formed along the outer circumference of the core 31, and the core 31 and the coating layer 32 which are drawn out become a coated thread while being cooled at a room temperature.

The housing 41 may include material grains therein, and any material that can melt by heat may be used. The coating layer may be formed by using a thermoplastic or thermosetting material such as TPU, etc., as well as PI.

According to various embodiments, the core 31 may be formed with TPEE, and the coating layer may be formed with PU. In particular, the core 31 may be formed with transparent TPEE. The outer skin 150 formed with the wefts 10 and the warps 20 formed as described above may allow light to pass there through, and may have various colors.

According to various embodiments, the thread drawn out may have various metallic textures and colors by mixing the coating material with pearl powder or metal powder. The outer skin 150 may be woven by using the threads fabricated as described above as the wefts 10 and the warps 20.

Figure 4:
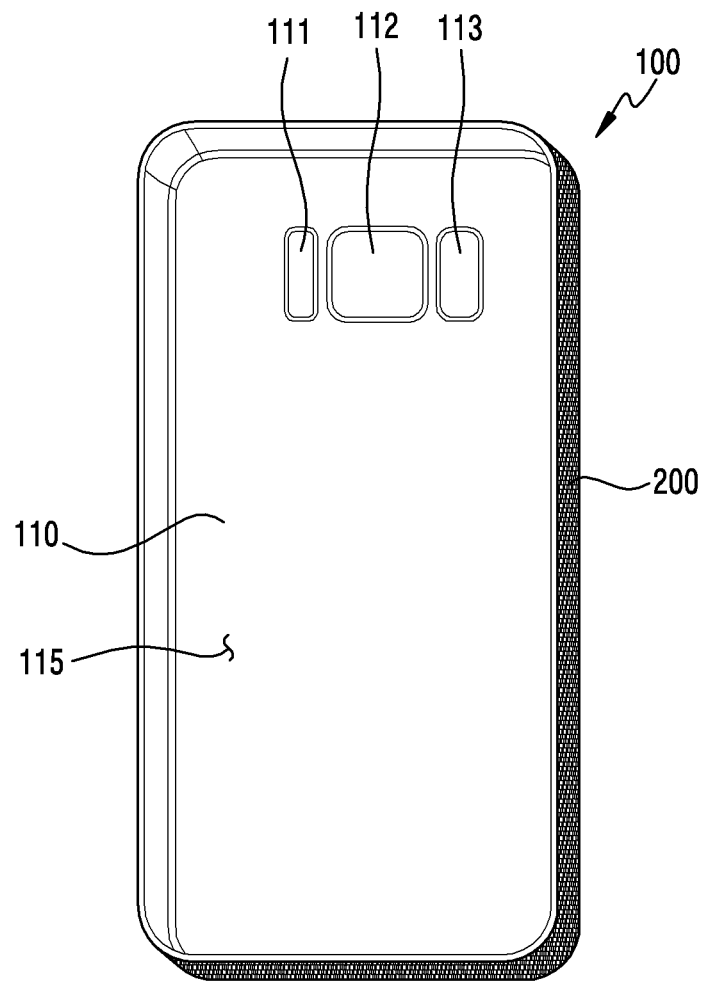
FIG. 4 is a perspective view illustrating an inner surface of an exterior case according to various embodiments.
Figure 5:
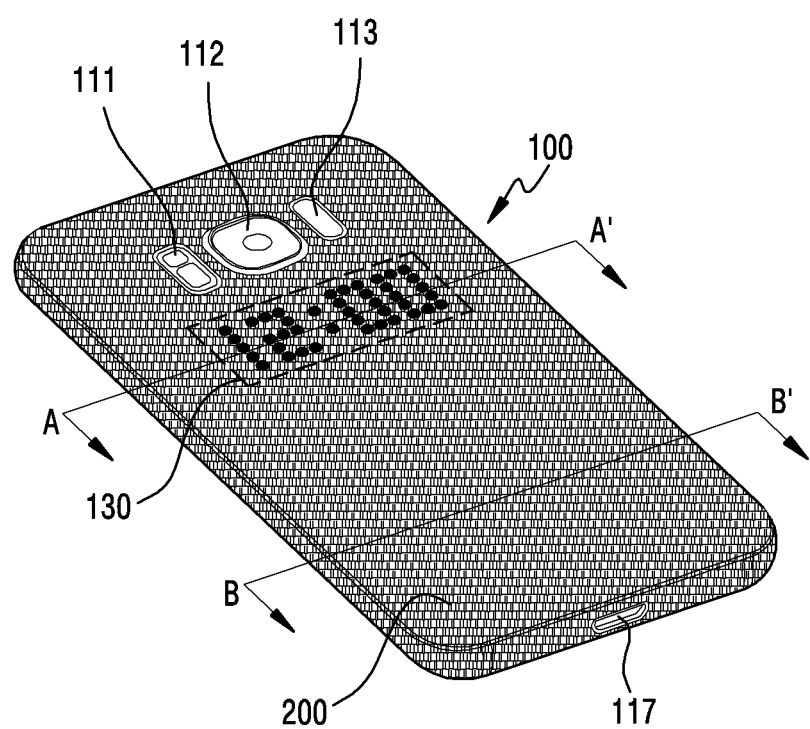
FIG. 5 is a perspective view illustrating an outer surface of the exterior case according to various embodiments.
Figure 6:
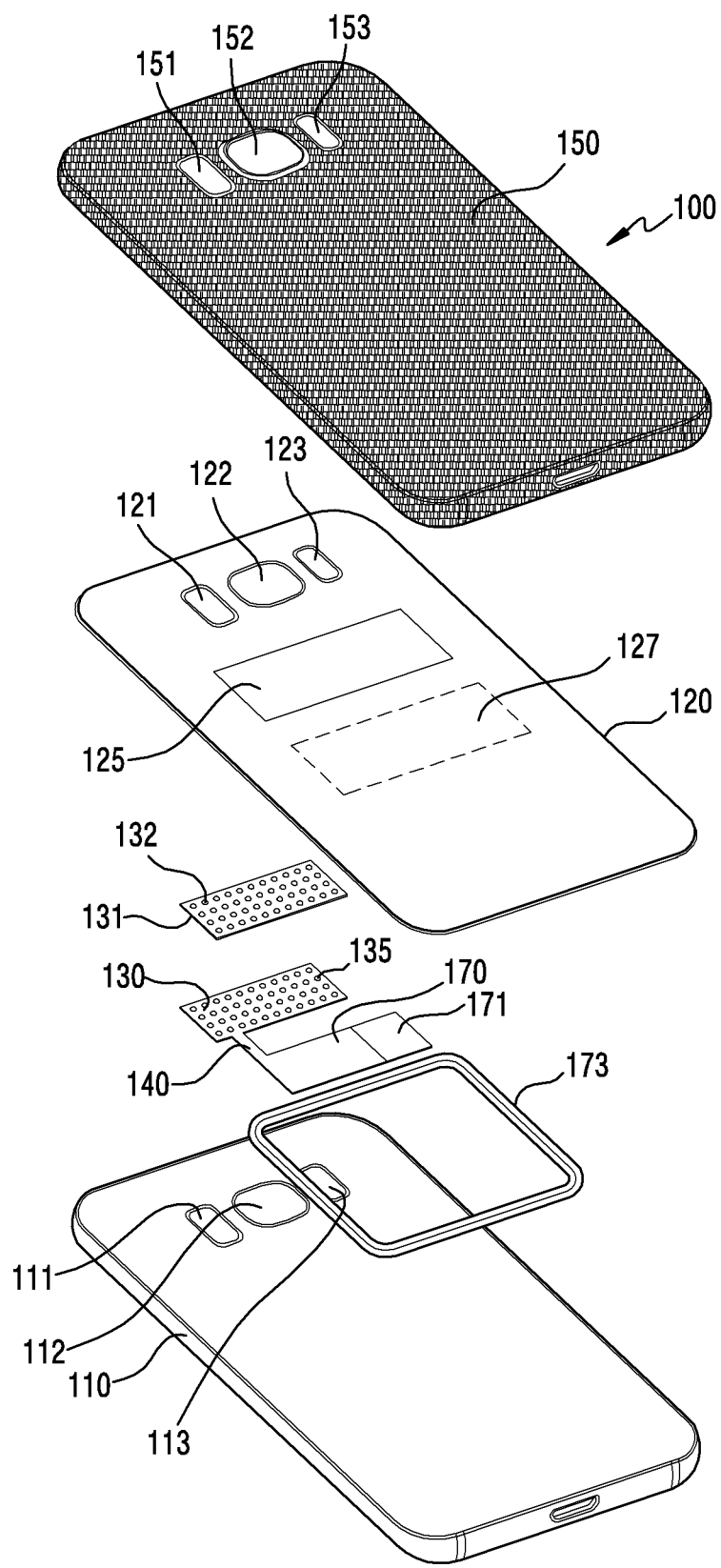
FIG. 6 is an exploded perspective view of the exterior case according to various embodiments.

FIG. 4 is a perspective view illustrating an inner surface of an exterior case according to various embodiments, FIG. 5 is a perspective view illustrating an outer surface of the exterior case according to various embodiments, and FIG. 6 is an exploded perspective view of the exterior case according to various embodiments.

Referring to FIG. 4, the exterior case 100 may include a base 110 and an outer skin 150.

The base 110 includes an inner space 115 to receive an electronic device. In addition, the base 110 may include a plurality of openings 111, 112, 113 corresponding to external sensors of the electronic device. For example, the first opening 111 may expose a fingerprint sensor of the electronic device, and the second opening 112 may expose a camera of the electronic device. The third opening 113 may expose a heart rate sensor of the electronic device. The positions, shapes, or number of the openings may be determined according to positions or shapes of the camera or the various sensors of the electronic device. A vertex area 119 of the base 110 may be determined according to a shape of the electronic device. The vertex area 119 of the base 110 may be bent at the right angle or may be smoothly curved. The outer skin 150 may be fabricated according to a shape of the base 110.

The outer skin 150 may be fabricated in various shapes, and may be woven with the wefts 10 and the warps 20 having a high elongation in order to be attached to the base 110. When the outer skin 150 covers the base 110 and a tension is applied to an edge of the outer skin 150, the outer skin 150 may be stretched. The stretched outer skin 150 may cover side surfaces 118a, 118b, 118c, 118d of the base 110 and the vertex area 119 of the base 110. The outer skin 150 may be stretched longer than a depth of the side surfaces 118a, 118b, 118c, 118d of the base 110, and the stretched portion of the outer skin 150 may wrap end portions of the side surfaces 118a, 118b, 118c, 118d. Through the above-described process, the outer skin 150 may cover an entire outer surface of the base 110 and may be fixed to the base 110.

The outer skin 150 having a high tension may cover the base 110 to suit the shape of the base 110. According to various embodiments, the weft 10 and the warp 20 has the core 31 having the high elongation, and may include the coating layer 32 formed by coating the core 31 with PU. A color of the outer skin 150 may be determined according to a color of the coating layer 32.

Referring to FIG. 5, the base 110 may be covered by the outer skin 150. A diode board 130 may be disposed on an outer surface of the exterior case 100, and the outer skin 150 may cover the diode board 130.

The outer skin 150 may be fabricated to have a shape corresponding to the openings 111, 112, 113 formed on the base 110 of the exterior case 100 for various sensors or a camera. According to various embodiments, the outer skin 150 may have a power supply hole 117 formed on one side surface 118c of the base 110 to correspond to a power supply port of the electronic device.

Light generated from the diode board 130 may pass through the outer skin 150 and may be transmitted to the outside. According to various embodiments, the diode board 130 may indicate a variety of information such as time, a received or missed message, call information, contacts, etc. The electronic device may communicate with the exterior case 100. Information displayed on the diode board 130 may be received from the electronic device and may be indicated on the diode board 130.

Referring to FIG. 6, the exterior case may include the base 110, a circuit board 170, a holder 120, and the outer skin 150.

The base 110 may include the openings 111, 112, 113 to expose a camera module 1380 (see FIG. 13), various sensor modules 1376 (see FIG. 13) of an electronic device 1301 (see FIG. 13) received in the base 110. In addition, the base 110 may have the power supply hole 117 formed on a side surface thereof.

The circuit board 170 may include the diode board 130, a communication antenna 171, and a coil 173.

The diode board 130 may be a board that includes a plurality of light emitting elements 135 like an LED panel or an LCD panel having a plurality of pixels. The plurality of light emitting elements 135 may indicate information received from an electronic device 1101. According to various embodiments, the diode board 130 may indicate information received from the electronic device, such as time, contacts, received information, call information, weather, etc. According to various embodiments, the diode board 130 may cover the entirety of the base 110, and the plurality of light emitting elements 135 may be disposed on various areas of the diode board 130. To achieve an aesthetic effect, the plurality of light emitting elements 135 may be disposed in a pattern. According to various embodiments, when the plurality of light emitting elements 135 are densely arranged on the diode board 130 of a size corresponding to the base 110, only some of the light emitting elements 135 may be turned on to display a pattern or a shape on the rear surface of the exterior case 100.

The communication antenna 171 may communicate with a communication module 1190 of the electronic device 1101. The communication antenna 171 may be, for example, a near field communication (NFC) antenna, and may be formed with a coil to receive a signal of a communication module 1390 (see FIG. 13). The communication antenna 171 may receive information of the electronic device 1301 such as time, contacts, received information, call information, weather, etc. through the communication module 1390 of the electronic device 1301. The communication antenna 171 may transmit a signal including the received information to a controller 172 electrically connected.

The controller 172 may process the received signal and may transmit the signal to the diode board 130. The diode board 130 may display information provided by the electronic device 1101 through the plurality of light emitting diodes based on the received signal.

The controller 172 and the diode board 130 may be electrically connected with each other. The controller 172 and the diode board 130 may be configured as one circuit board 170, and may be electrically connected with each other through a flexible printed circuit board (FPCB).

The coil 173 may induce electromagnetism with an antenna module 1197 of the electronic device 100. The coil 173 may generate a current through electromagnetic induction. The coil 173 may supply the generated current to the circuit board 170 including the controller 172, the communication module 171, the diode board 130, etc.

According to various embodiments, the base 110 may not include a coil. The base 110 may include a terminal (not shown) or a battery (not shown) electrically connectable to an electronic device 1201 in order to supply a current to an element requiring power like the circuit board 170.

The exterior case 100 may include a light passing portion 131 of a size corresponding to the diode board 130. The light passing portion 131 may have light passing holes 132 corresponding to the plurality of light emitting diodes 135 installed on the diode board 130. Light emitted from the light emitting diodes 135 may be discharged to the outside through the light passing holes 132. The light passing holes 132 can prevent light emitted from the respective light emitting diodes 135 from interfering with one another, and may prevent light from being diffused. The light passing holes 132 may increase visibility of light recognized from the outside.

The holder 120 may include openings 121, 122, 123 corresponding to the openings 111, 112, 113 of the base 110. The holder 120 may include a diode board coupling hole 125 to have the diode board 130 and the light passing portion 131 installed and fixed therein. The holder 120 may further include a recess 127 to have the circuit board 170 seated thereon.

The circuit board 170 may be coupled to the recess 127 formed on the holder 120 by snap-fitting or fastening between a protrusion (not shown) and a fastening recess (not shown), and the circuit board 170 may be fixed to the holder 120 by using an adhesive material between the recess 127 and the circuit board 170. The holder 120 may have an opening instead of the recess 127 for fastening the circuit board 170, and may fasten only the diode board 130.

The diode board 130 and the light passing portion 131 may be physically fastened to each other in the above-described method, or may be coupled to each other by using an adhesive material. The diode board 130 and the diode board coupling hole 125 may be physically fastened to each other or may be coupled to each other by using an adhesive material.

The holder 120 may make the surface of the diode board 130 and the surface of the holder 120 flat, and the holder 120 may hide elements included in the circuit board 170. The circuit board 170 including the diode board 130 attached to the holder 120 may be easily coupled with the outer skin 150. The outer skin 150 may include openings 151, 152, 153 corresponding to the openings 111, 112, 113 of the base 110, and may include an opening 157 corresponding to the power supply hole 117 of the base.

The outer skin 150 may be formed with wefts 10 and warps 20. The weft 10 and the warp 20 may be formed with the same material. The weft 10 and the warp 20 may have a core 31 formed with TPEE, and may have a PU coating layer 32 surrounding the outer circumference of the core 31.

The outer skin 150 may be formed in a color to hide the diode board 130, the circuit board 170, and the FPCB 140. When the circuit board 170 is not exposed by the holder 120, a color of the outer skin 150 may be selected to hide the diode board 130.

The color of the outer skin 150 may be determined by a color of the weft 10. The outer skin 150 may have a different color in a predetermined area according to the color of the weft 10. Accordingly, the outer skin 150 may be woven to have a different color or a different tone only in an area where the diode board 130 is disposed.

According to various embodiments, the outer skin 150 may be woven in a color to hide the circuit board 170 and the FPCB 140 in areas where the circuit board 170 and the FPCB 140 are disposed, and may be woven in a different color in an area where the diode board 130 is disposed.

According to various embodiments, the outer skin 150 may have a color to increase visibility of light emitted from the plurality of light emitting diodes 135 in an area where the diode board 130 is disposed.

The circuit board 170 may include the controller 172 and a memory (not shown). The memory may include color, color intensity, and gradation information of the outer skin 150. The controller 172 may control light emitted from the plurality of light emitting diodes 135 to pass through the outer skin 150 and to be recognized from the outside, based on the color, color intensity, and gradation information of the outer skin 150 stored in the memory.

Figure 7:
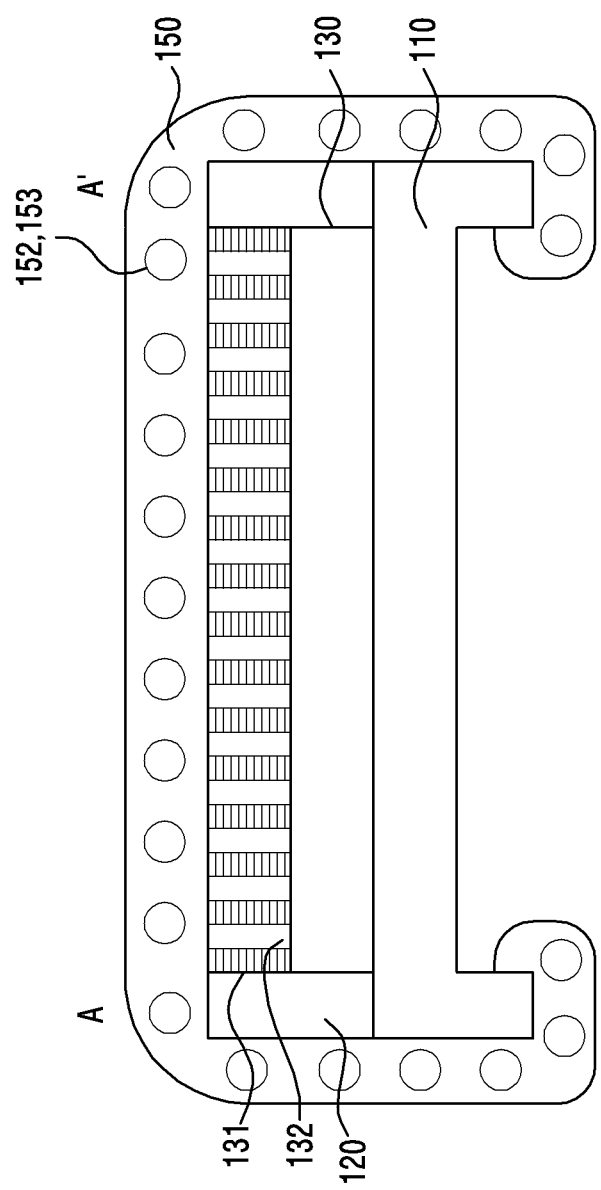
FIG. 7 is a cross-sectional view taken on line A-A' of FIG. 5.

FIG. 7 is a cross-sectional view taken on line A-A' of FIG. 5.

Referring to FIG. 7, the exterior case 100 may have the base 110, the diode board 130, the light passing portion 131, and the outer skin 150 stacked one on another.

The base 110 may be formed by injection molding or molding. The diode board 130 may be stacked on an upper portion of the base 110. The light passing portion 131 may include the light passing holes 132 corresponding to the plurality of light emitting diodes 135 disposed on the diode board 130. The light passing portion 131 may have the light passing holes 132 aligned on positions of the plurality of light emitting diodes 135 and disposed on the diode board 130.

The base 110, the diode board 130, and the light passing portion 131 may be stacked one on another by using an adhesive film or an adhesive material. According to another embodiment, the base 110 and the diode board 130 may be fixed to each other by bonding or physically press-fitting or snap-fitting, and the diode board 130 and the light passing portion 131 may be physically press-fitted or snap-fitted to be fixed to each other.

The diode board 130 and the light passing portion 131 may be coupled to each other by the holder 120. The diode board 130 and the light passing portion 131 may be fastened to the holder 120 through the diode board coupling hole 125 formed on the holder 120. According to various embodiments, the plurality of light emitting diodes 135 of the diode board 130 and the plurality of light passing holes 132 may be aligned with each other and may be coupled to the holder 120.

The outer skin 150 may be stacked on an upper portion of the light passing portion 131. The outer skin 150 may be formed with the wefts 152 and the warps 153. The outer skin 150 and the light passing portion 131 may be bonded to each other by an adhesive material.

The outer skin 150 may cover along the side surface of the holder 120, the side surface of the base 110. The outer skin 150 may be bonded to the side surfaces of the base 110 and the holder 120 by an adhesive material.

When there does not exist the holder 120, the base 110 may have a height difference according to heights of the diode board 130 and the light passing portion 131. Due to the height difference of the base 110, the diode board 130, and the light passing portion 131, the outer skin 150 may not be easily bonded to the diode board 130, the light passing portion 131, and the base. According to another embodiment, when it is difficult to directly bond the diode board 130 or the light passing portion 131 to the outer skin 150, the holder 120 may make it easy to bond to the outer skin 150.

The outer skin 150 may cover at least a portion of the side surface 118b, 118d of the base 110, and may increase a coupling force with the base 110.

The weft 152 and the warp 153 of the outer skin 150 may include a PU coating layer formed on a transparent TPEE core, and may allow light to pass therethrough. According to various embodiments, light of the plurality of light emitting diodes 135 transmitted through the light passing holes 132 may pass through the outer skin 150 and may be visually recognized from the outside of the exterior case 100.

Figure 8:
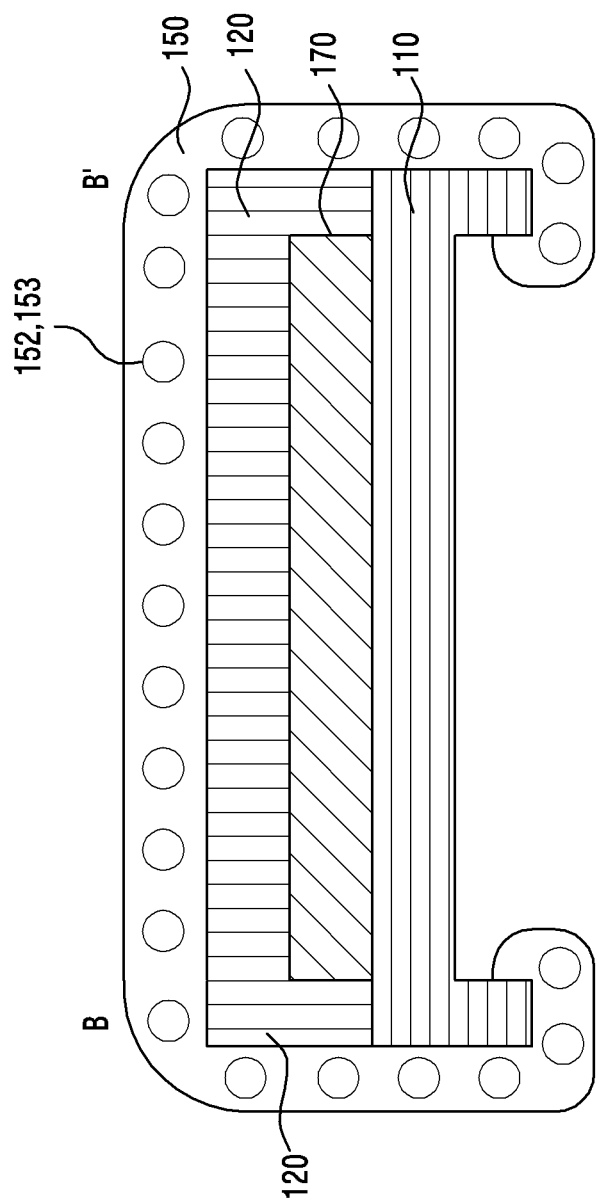
FIG. 8 is a cross-sectional view taken on line B-B' of FIG. 5.

FIG. 8 is a cross-sectional view taken on line B-B' of FIG. 5.

Referring to FIG. 8, the exterior case 100 may have the base 110, the circuit board 170, the holder 120, and the outer skin 150 stacked one on another.

The base 110 may be formed by various molding methods. The circuit board 170 may be stacked on an upper portion of the base 110. An adhesive film or an adhesive may be coated between the circuit board 170 and the base 110. The circuit board 170 and the base 110 may be coupled to each other by an adhesive film or an adhesive. A recess or a protrusion may be formed on the circuit board 170 and the base 110, such that the circuit board 170 and the base 110 are fixed by snap-fitting or press-fitting.

The holder 120 may have the recess 127, and the recess 127 and the circuit board 170 may be fastened to each other. According to various embodiments, an adhesive film or an adhesive may be coated between the recess 127 and the circuit board 170.

The outer skin 150 may include the wefts 152 and the warps 153. The outer skin 150 may be bonded to the holder 120 by an adhesive material. The holder 120 may have an opening instead of the recess 127, such that the circuit board 170 is exposed to the outside of the holder 120. When the circuit board 170 is exposed to the outside of the holder 120, the outer skin 150 may be directly bonded to the circuit board 170. In this case, a color of the outer skin 150 may be selected so as to hide the circuit board 170. That is, a color of the weft 152 may be determined according to a color of the circuit board 170.

The outer skin 150 may cover the side surfaces of the holder 120 and the base 110. The outer skin 150 may be bonded to the side surfaces of the base 110 and the holder 120 by an adhesive material.

When there does not exist the holder 120, the base 110 may have a height difference according to a height of the circuit board 170. Due to the height difference of the base 110 and the circuit board 170, it may not be easy to bond the outer skin 150 to the circuit board 170 and the base 110. Since the circuit board 170 includes various elements, the surface thereof may be uneven and may make it difficult to bond the circuit board 170 to the outer skin 150. According to various embodiments, the holder 120 may make it easy to bond the circuit board 170 and the outer skin 150.

The outer skin 150 may be extended from the side surface 118b, 118d of the base 110. The outer skin 150 may cover at least a portion of the side surface 118b, 118d of the base 110, and may increase a coupling force with the base 110.

Figure 9:
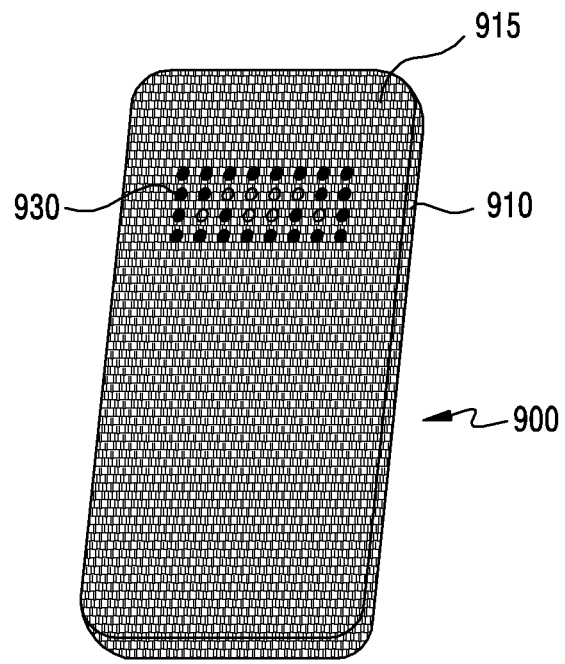
FIG. 9 is a perspective view of an exterior case according to other various embodiments.
Figure 9:
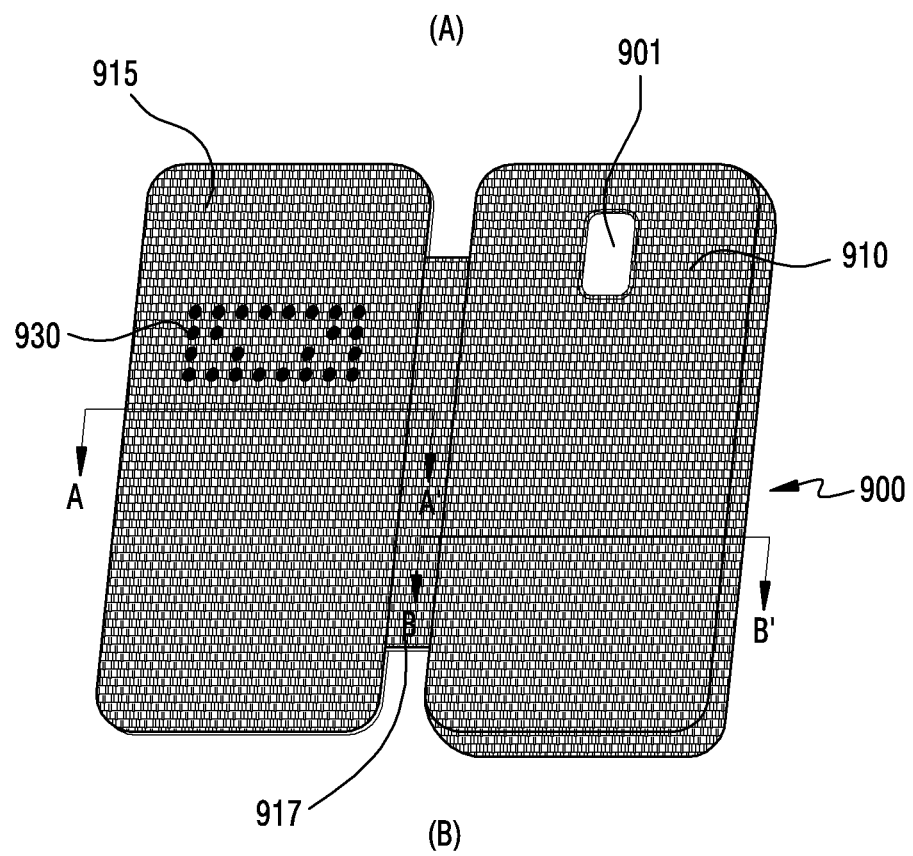
Figure 10:
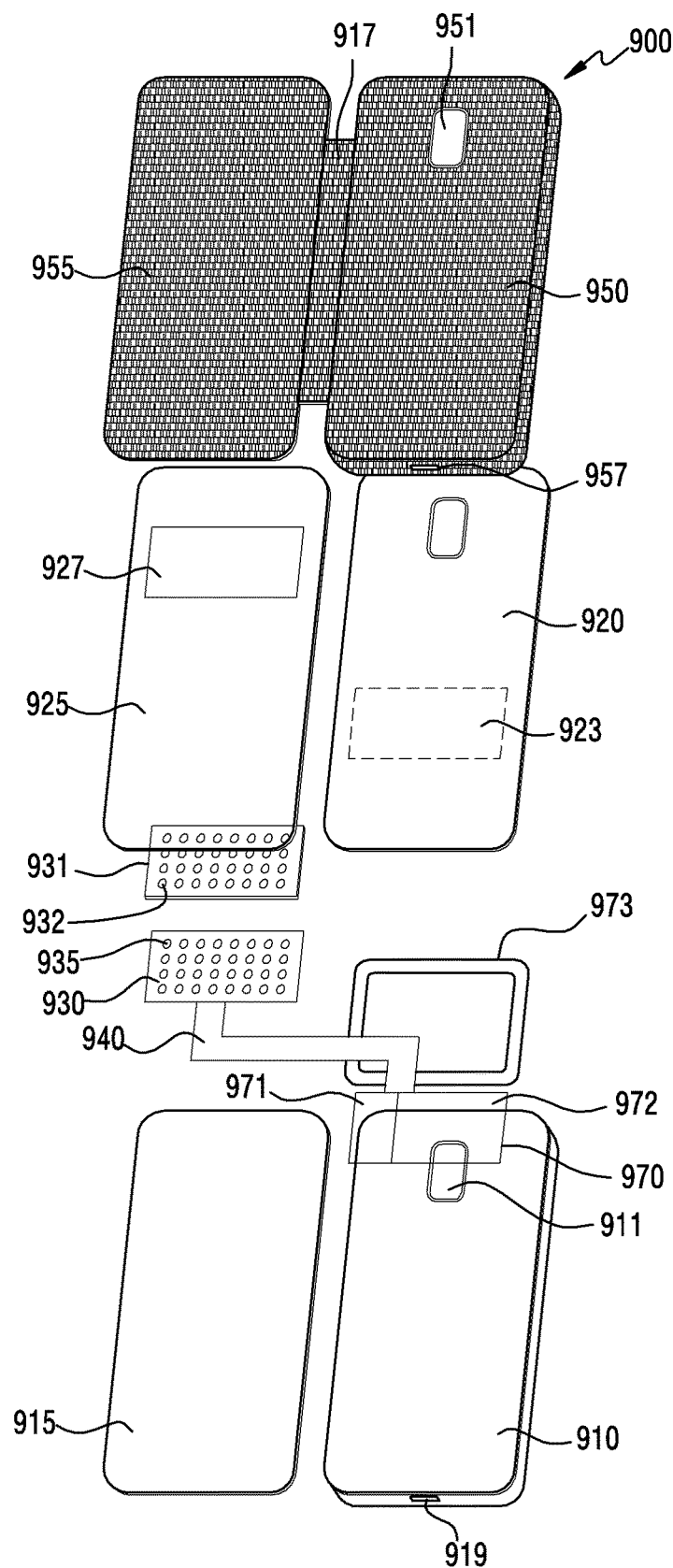
FIG. 10 is an exploded perspective view of an exterior case according to other various embodiments.

FIG. 9 is a perspective view of an exterior case according to other various embodiments, and FIG. 10 is an exploded perspective view of the exterior case according to other various embodiments.

Referring to FIGS. 9A and 9B, the exterior case 900 may include a base 910 and a cover 915.

The base 910 may include an inner space to receive the electronic device 1201. The base 910 may include an opening 901 to expose various sensors or a camera module.

The cover 915 may be disposed to be rotatable about one edge of the base 901. The cover 915 may be opened and closed to expose a front-facing display of the electronic device 1201 received in the base 910.

According to various embodiments, the cover 915 may include a diode panel 930 including a plurality of light emitting elements 935. The diode panel 930 may be disposed on an outer surface of the cover to emit light to the outside of the cover 915.

The base 910 and the cover 915 may be integrally formed with each other by a connection portion 917. The connection portion 917 may be extended from at least a certain area of one edge of the base 910 to be connected with the cover 915. The connection portion 917 may be formed with the same material as outer skins 950, 955 covering the base 910 and the cover 915. The connection portion 917 and the outer skin 950 of the base 910 and the outer skin 955 of the cover 915 may be integrally formed with one another.

Referring to FIG. 10, the exterior case 900 may include a base 910, a cover 915, a circuit board 970, holders 920, 925, and outer skins 950, 955.

The base 910 may include an opening 911 to expose a camera module 1280, various sensor modules 1276 of the electronic device 1201 received in the base 910. The base 910 may have a power supply hole 919 formed on one side surface thereof. A supply port of the electronic device 1201 may be exposed to the outside through the power supply hole 919.

The circuit board 970 may include a diode board 930, a communication antenna 971, and a coil 973.

The diode board 930 may be a board that includes a plurality of light emitting elements 935 like an LED panel or an LCD panel having a plurality of pixels. The plurality of light emitting elements 935 may indicate information received from the electronic device 1201, such as time, contacts, received information, call information, weather, etc.

The communication antenna 971 may communicate with the communication module 1290 of the electronic device 1201. The communication antenna 971 may be formed with a coil. The communication antenna 971 may communicate with the communication module 1290 of the electronic device 1201 through electromagnetic induction, and may be an NFC antenna. The communication antenna 971 may transmit a signal received from the communication module 1290 to a controller 972.

The controller 972 may process the received signal and may transmit the signal to the diode board 930. The diode board 930 may display information of the electronic device 1201 through the plurality of light emitting diodes 935, based on the received signal.

The coil 973 may induce electromagnetism with the antenna module 1297 of the electronic device 1201. The coil 973 may generate a current through the electromagnetic induction. The coil 973 may supply the generated current to the circuit board 970.

According to various embodiments, the base 910 may not include a coil. The base 910 may include a terminal (not shown) or a battery (not shown) electrically connectable with the electronic device 1201.

The communication module 971, the controller 972, the coil 973, and a memory (not shown) may be disposed on one surface of the base 910.

When the electronic device 1201 is received in the base to perform short range wireless communication between the communication module 971 and the electronic device 1201, the communication module 971 may be disposed in the proximity of the communication module 1290 of the electronic device 1201. According to various embodiments, the communication module 971 may be disposed on a position of the base corresponding to the communication module 1290 of the electronic device 1201.

The coil 973 may be disposed on the base 910 to cause electromagnetic induction with the antenna module 1297 of the electronic device 1201. To increase efficiency of electromagnetic induction with the antenna module 1297, the coil 973 may be disposed on a position of the base corresponding to a position of the antenna module 1297. The coil 973 may be disposed along a circumference of the base 910. The coil 973 may be electrically connected with elements of the circuit board 970, and a size of the coil 973 may be determined according to required power of the exterior case 900.

When the cover 915 covers the front surface of the electronic device 1201, the diode board 930 may express information of the electronic device 1201 on the outside. The diode board 930 may be disposed on one surface of the cover 915.

The controller 972 and the diode board 930 may be electrically connected with each other through an FPCB 940.

A portion of the FPCB 940 may be positioned on the base 910, and the other portion of the FPCB 940 may be positioned on the cover 915. Since the cover 915 is rotatable about one edge of the base 910, the elements of the circuit board 970 positioned on the base 910 and the diode board 930 may be connected to the bendable FPCB 940.

The exterior case 900 may include a light passing portion 931 of a size corresponding to the diode board 930. The light passing portion 931 may have light passing holes 932 to correspond to the plurality of light emitting diodes 935 installed on the diode board 930. Light emitted from the plurality of light emitting diodes 935 may be discharged to the outside through the light passing holes 932. The light passing holes 932 may serve to guide a path of light, and can prevent light emitted from the respective light emitting diodes 935 from interfering with one another. According to various embodiments, the light passing holes 932 can increase visibility of light recognized from the outside.

The holder for seating the circuit board 970 and the diode board 930 on the base 910 and the cover 915 may include a base holder 920 and a cover holder 925. The base holder 920 and the cover holder 925 may be formed in shapes corresponding to the base 910 and the cover 915.

The base holder 920 may have a recess 923 for seating the circuit board 970 therein. The base holder 920 may have an opening formed on a position corresponding to the opening 911 formed on the base 910, and through this opening, the camera module or various sensors of the electronic device 1201 may be exposed to the outside. The base holder 920 may additionally have a recess (not shown) corresponding to the FPCB 940 and the coil 973. The circuit board 970, the FPCB 940, and the coil 973 may be seated between the base holder 920 and the base 910. The circuit board 970 may be coupled with the base holder 920 by snap-fitting into the recess 923 formed on the base holder 920, or a fastening method between a protrusion and a fastening recess. The circuit board 970 may be seated on the base holder 920 by using an adhesive material between the recess 923 and the circuit board 970. The base holder 920 may prevent the circuit board 970 including various electronic elements and the coil 973 from being brought into direct contact with the outer skin 950. The base holder 920 may be coupled to the outer skin 950, such that the circuit board 970 and the coil 973 are mounted inside the exterior case 900. According to various embodiments, the base holder 920 may include an opening instead of the recess 923 to fasten the circuit board 970.

The cover holder 925 may include a diode board coupling hole 927 for seating the diode board 930 and the light passing portion 931 therein. The diode board 930 and the light passing portion 931 may be physically fastened to each other or may be coupled to each other by an adhesive material. The diode board 930 and the light passing portion 931 may be inserted into the diode board coupling hole 927 and seated on the base 910. The diode board coupling hole 927 and the diode board 930 or the light passing portion 931 may be physically fastened to each other or may be coupled by an adhesive material.

The outer skins 917, 950, 955 may formed with wefts 10 and warps 20. The weft 10 and the warp 20 may be formed with the same material. The weft 10 and the warp 20 may have a core 31 formed with TPEE, and may have a PU coating layer 32 surrounding an outer circumference of the core 31.

The outer skin 950 formed on an upper portion of the base 910 may be formed in a color to hide the circuit board 970 and the FPCB 940. When the circuit board 970 is not exposed by the base holder 920, the outer skin 950 may be formed in a color to hide the FPCB 940.

The outer skin 955 formed on an upper portion of the cover 915 may have a color selected to hide the light passing portion 931 or the diode board 930, and the outer skin 917 formed on one edge of the base 910 may have a color selected to hide the FPCB 940.

The outer skins 917, 950, 955 may be integrally formed with one another, and may form an exterior of the exterior case 900 by covering an assembly of the base 910, the cover 915, the holders 920, 925, and various components. The outer skins 917, 950, 955 may be woven in a single color, or may include a different color or a different color intensity in a predetermined area.

According to various embodiments, the outer skin 955 formed on the upper portion of the cover 915 may have a color selected to increase visibility of light emitted from the plurality of light emitting diodes 935 in an area where the diode board 930 is disposed.

The circuit board 970 may include the controller 972 and a memory (not shown). The memory may include color, color intensity, and gradation information of the outer skin 955 formed on the upper portion of the cover. The controller 972 may control light emitted from the plurality of light emitting diodes 935 to pass through the outer skin 955 and to be recognized from the outside, based on the color, color intensity, and gradation information of the outer skin 955 stored in the memory.

Figure 11A:
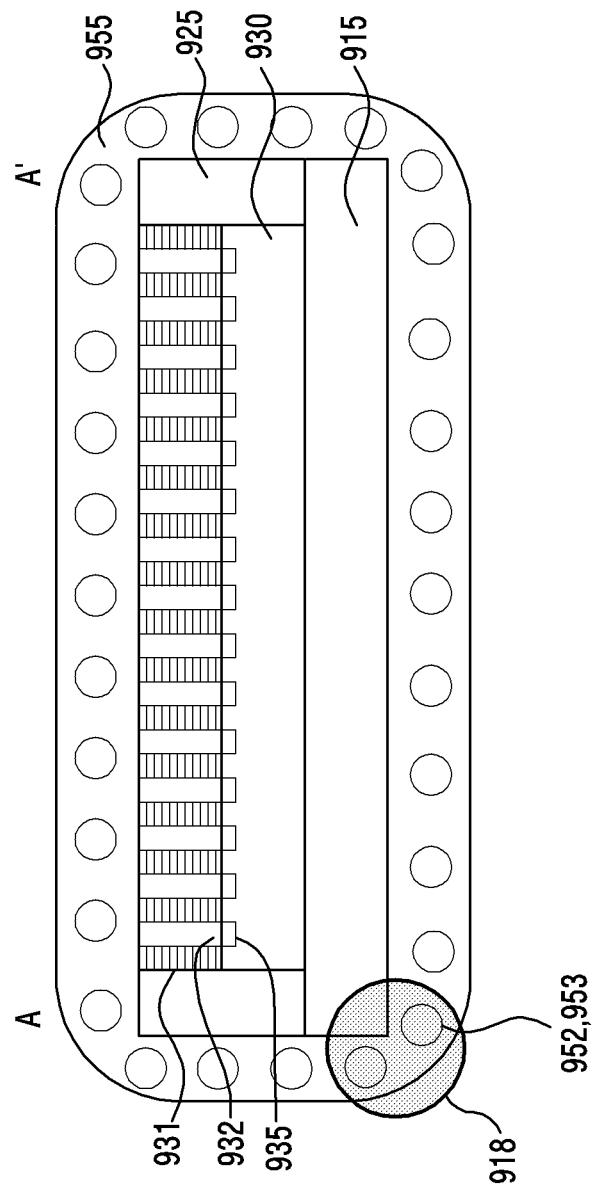
FIG. 11A and FIG. 11B are cross-sectional view taken on lines A-A' and B-B' of FIG. 9.
Figure 11B:
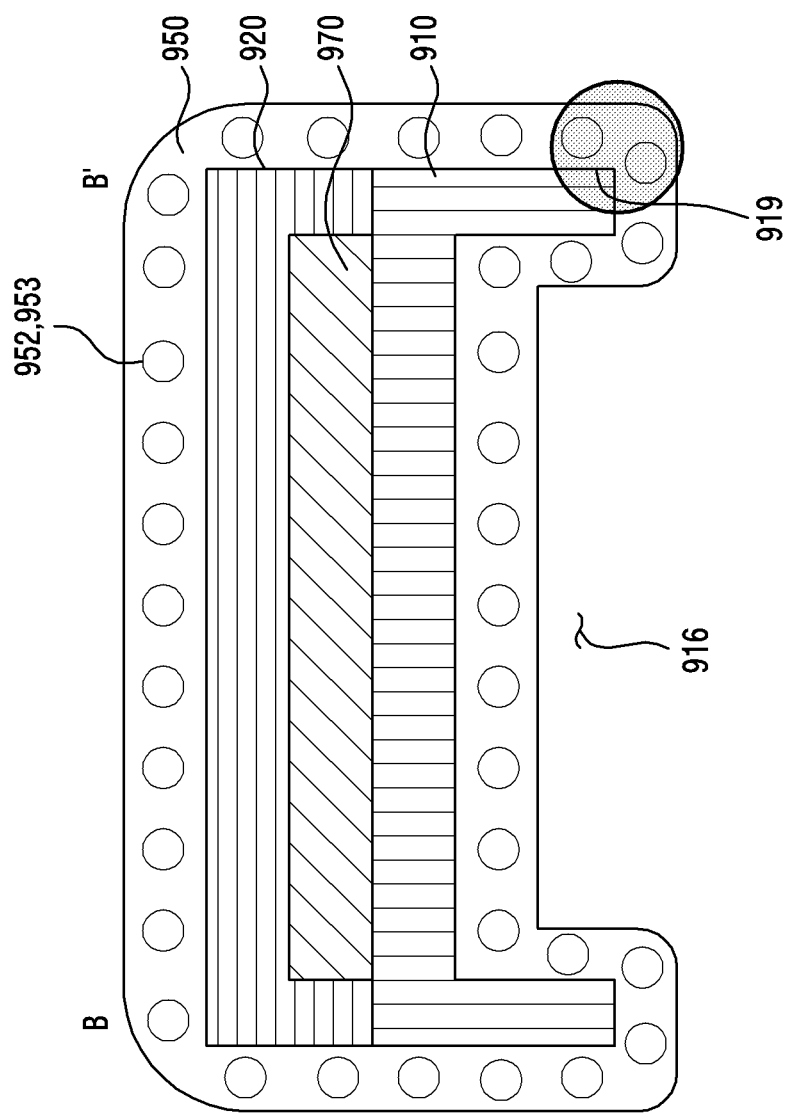

FIGS. 11A and 11B are cross-sectional views taken on lines A-A' and B-B' of FIG. 9.

Referring to FIG. 11A, the cover 915 portion of the exterior case 900 may have the cover 915, the diode board 930, and the light passing portion 931 stacked one on another. The outer skin 955 may cover the cover 915, the diode board 930, and the light passing portion 931 stacked one on another.

The cover 915 may be formed by injection molding or molding. The diode board 930 may be stacked on one surface of the cover 915. The light passing portion 931 may include the light passing holes 932 corresponding to the plurality of light emitting diodes 935 mounted on the diode board 930. The light passing portion 931 may have the light passing holes 932 aligned on positions of the plurality of light emitting diodes 935 and disposed on the diode board 930.

The cover 915, the diode board 930, and the light passing portion 931 may be stacked one on another by using an adhesive film or an adhesive. According to another embodiment, the diode board 930 and the light passing portion 931 may be coupled to each other by the holder 920. The diode board 930 and the light passing portion 931 may be fastened to the cover holder 925 through the diode board coupling hole 927 formed on the cover holder 925.

The outer skin 955 may cover the entire cover assembly including the cover 915, the diode board 930, and the light passing portion 931. The outer skin 955 may be stacked on one surface of the light passing portion 931. When the electronic device 1201 is used, the cover 915 may rotate about one edge of the base 910 to expose a surface of the electronic device 1201. According to various embodiments, the cover 915 may have both an inner surface, an outer surface exposed, such that the outer skin 955 may cover both the inner surface and the outer surface of the cover 915.

Referring to FIG. 11B, the base 910 portion of the exterior case 900 may have the base 910, the circuit board 970, and the holder 920 stacked one on another, thereby forming a base assembly.

The outer skin 950 may cover the base assembly. A back surface portion where the receiving space of the base 910 is positioned as shown in FIG. 8 may not be covered by the outer skin 950.

The base 910 may be formed in various molding methods. The circuit board 970 may be stacked on one surface of the base 110. The circuit board 970 and the base 910 may be coupled to each other by coating an adhesive film or an adhesive therebetween. The circuit board 970 and the base 910 may be fixed to each other by snap-fitting or press-fitting by using a recess or protrusion formed thereon.

The base holder 920 may have the recess 923, and the recess 923 and the circuit board 970 may be fastened to each other. According to various embodiments, an adhesive film or an adhesive may be coated between the recess 923 and the circuit board 970, such that the circuit board 970 is seated on the base holder 920.

The outer skin 950 may include wefts 952 and warps 953. The outer skin 950 may be coupled with the base assembly by an adhesive or an adhesive film coated on a surface of the base assembly. The holder 920 may have an opening instead of the recess 923, such that the circuit board 970 is exposed to the outside of the holder 920. When the circuit board 970 is exposed to the outside of the holder 920, the outer skin 950 may be directly bonded to the circuit board 971. In this case, the outer skin 950 may have a color selected to hide the circuit board 970. That is, a color of the weft 952 may be determined according to a color of the circuit board 970.

In FIG. 8, the outer skin may cover a side surface of the base 910. According to various embodiments, referring to FIG. 11B, the outer skin 950 may cover a surface of the base 910 where the receiving space 916 exists.

Referring to FIGS. 11A and 11B, the outer skins 950, 955 may cover the base 910 and the cover 915, respectively. According to various embodiments, the outer skins 917, 950, 955 may be integrally formed with one another as shown in FIG. 10. An outer skin 919 of the outer skin 950 covering the base 910 that is positioned on one edge of the base 910 may be integrally formed with the connection portion 917. An outer skin 918 positioned on one edge of the cover 915 rotating about one edge of the base 910 may be integrally formed with the connection portion 917.

According to another embodiment, the outer skin 919 positioned on one edge of the base 910 and the outer skin 918 positioned on one edge of the cover 915 may be coupled to each other and integrally formed. Since the outer skins 950, 955 are formed with a material of a high elongation, the cover 915 can be easily opened and closed with respect to the base 910.

Figure 12:
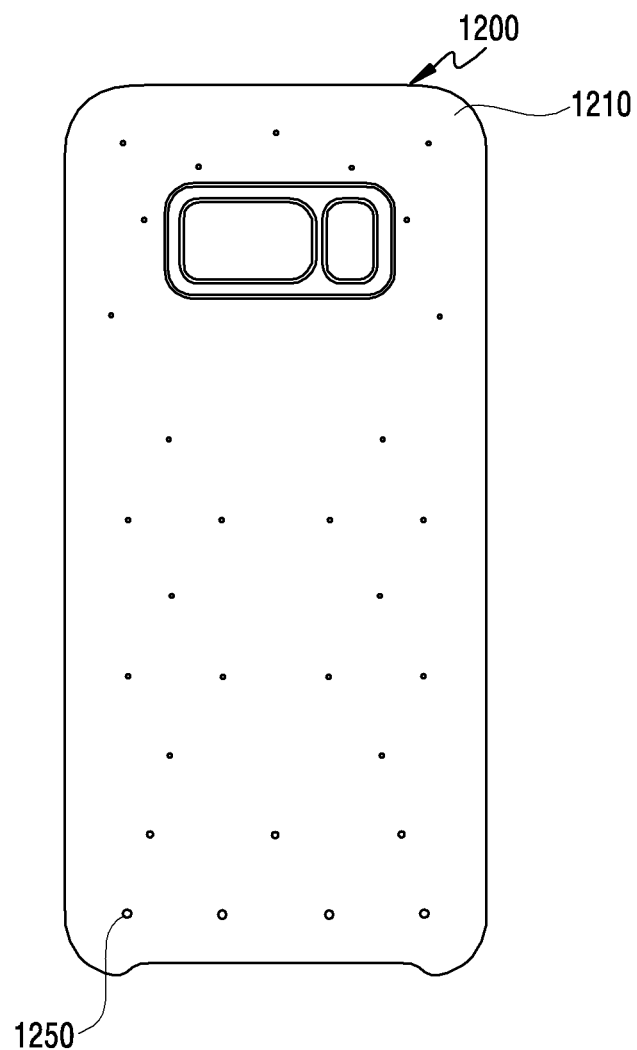
FIG. 12 is a top view of an exterior case according to various embodiments.

FIG. 12 is a top view of an exterior case according to various embodiments.

According to an embodiment, the exterior case 1200 may include a case rear surface 1201 and a plurality of case light passing holes 1250. The light emitting diodes 135 of the diode board 130 may be disposed on positions corresponding to the plurality of light passing holes 1250 and may emit light. The plurality of light passing holes 1250 formed in the exterior case 1200 may be formed on various positions, in various sizes. Light emitted through the light passing holes 1250 disposed in various sizes or shapes may have different luminance according to sizeS of the light passing holes 1250 and a shape of emitted light may be different.

According to various embodiments, the exterior case may be formed with polycarbonate (PC), silicon, thermoplastic poly urethane (TPU) by injection molding. When the exterior case is formed by injection molding, the light passing holes 1250 may be formed by using a mold having protrusions corresponding to the light passing holes 1250.

According to various embodiments, when the exterior case 1200 is formed with a material capable of allowing light to pass therethrough, the light passing holes 1250 may not be formed and the light emitting diodes 135 may be disposed on various positions.

Figure 13:
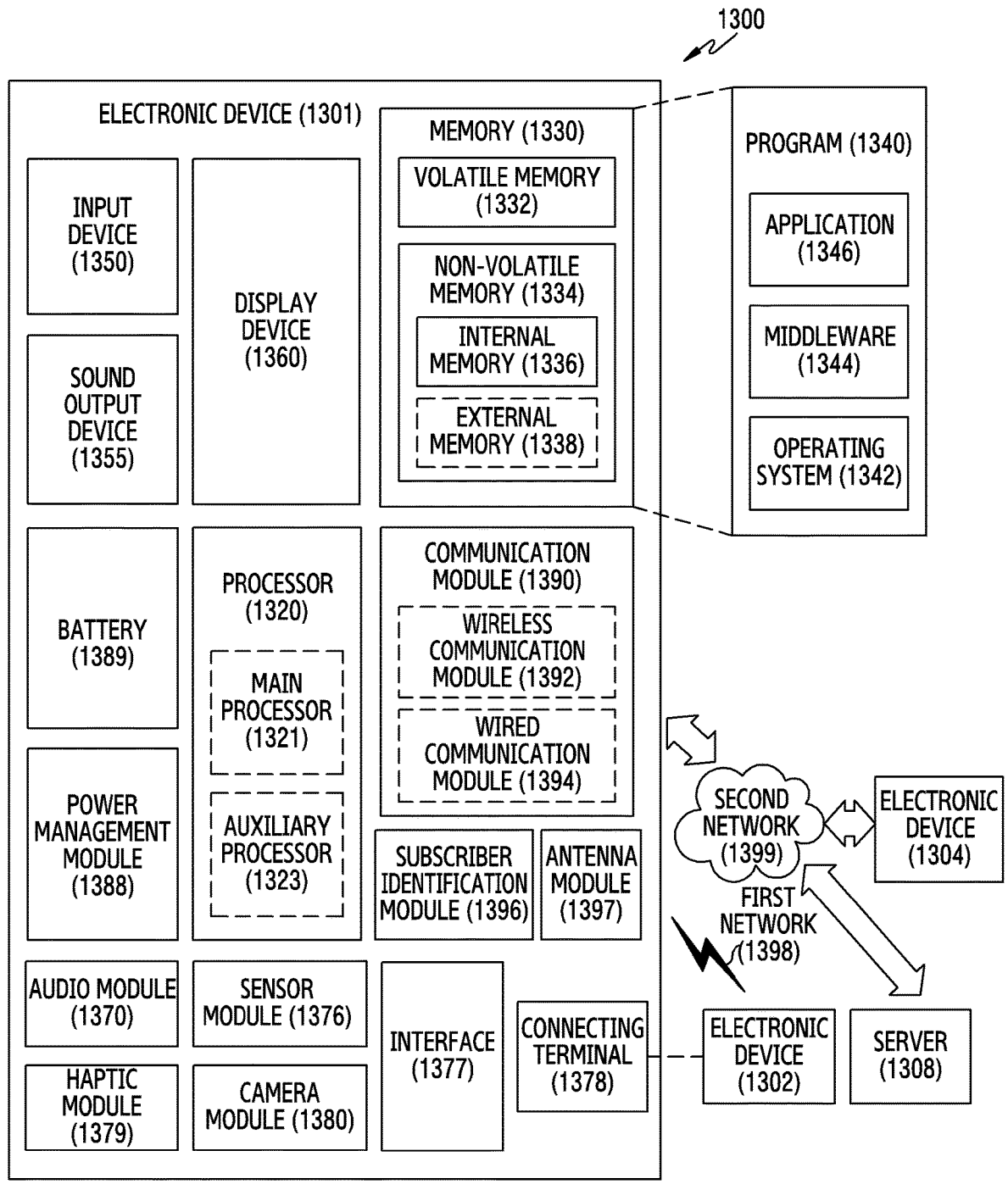
FIG. 13 is a block diagram of an electronic device in a network environment according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module(SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor(e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 14:
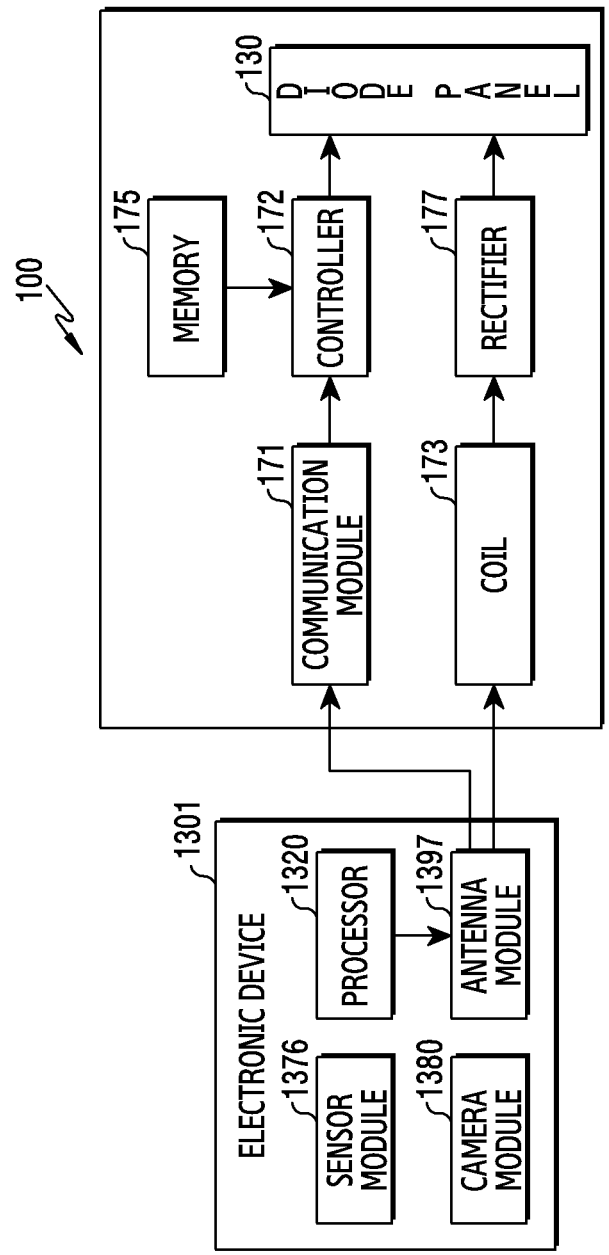
FIG. 14 is a block diagram of an exterior case according to various embodiments.

FIG. 14 is a block diagram of an exterior case according to various embodiments.

Referring to FIG. 14, the exterior case 100 may include a communication module 171, a controller 172, a coil 173, a memory 175, a rectifier 177, and a diode board 130.

According to various embodiments, the communication module 171 may support establishment of a wired communication channel or a wireless communication channel between the exterior case 100 and an electronic device 1301, and communication performance through the established communication channel. According to various embodiments, the communication module 171 may include a wireless communication module (for example, a short-range wireless communication module or a Bluetooth communication module) or an electrically connected wired communication module.

According to various embodiments, the communication module 171 may receive a signal from an antenna module 1397 of the electronic device 1301. The communication module 171 may transmit the signal received from the antenna module 1397 to the controller 172. For example, a processor 1320 of the electronic device 1301 may process information related to time, message reception, call connection, etc. and may control the antenna module 1397 to transmit a signal to the communication module 171 of the exterior case 100.

According to various embodiments, the controller 172 may process the signal received from the communication module 171, and may control an operation of the diode board 130. For example, the controller 172 may acquire a signal regarding time, weather information from the electronic device 1301 in a standby state, and may control the diode board 130 to display information regarding time, weather information, etc.

According to another embodiment, when an event of message reception, call connection, etc. occurs, the controller 172 may process a signal regarding the message or call connection, and control the display panel 130 to display message reception, contacts of the other person, etc.

According to another embodiment, the memory 175 may store color information, color intensity information, etc. of the outer skin 150. The controller 172 may control the diode board 130 to emit light having high visibility, based on the color information, color intensity information stored in the memory 175. For example, the controller 172 may receive current time, weather information, etc. from the electronic device, and may control color, luminance, etc. of light emitted from the diode board 130, based on color information of the outer skin 150 stored in the memory.

According to various embodiments, the coil 173 may generate a current through electromagnetic induction with the antenna module 1397 of the electronic device 1301. When a current flows through a coil of the antenna module 1397, an induced current may flow through the coil 173. The current induced in the coil 173 may supply power to components of the exterior case 100 including the diode board 130, etc. The current induced in the coil 173 may be an alternating current and may be changed to a direct current through the rectifier 177. For example, the rectifier 177 may be an AC-DC converter.

According to various embodiments, when the exterior case 100 and the electronic device 1301 are electrically connected with each other, a converter circuit, etc. may be included instead of the coil 173, the rectifier 177, and may transmit a signal to the controller through a separate signal line. According to another embodiment, the exterior case 100 may include a battery instead of the coil 173, the rectifier 177.

The diode board 130 may include a digitizer panel (not shown), and in this case, a user may control the electronic device 1301 by inputting through a surface of the exterior case 100 on the diode board 130. For example, when a display informing call reception is displayed through the diode board 130, the electronic device 1301 may go into a call reception state or a call rejection state by an input operation of the user.

According to various embodiments, when the sensor module 1378 is used and the display 1360 of the electronic device 1301 is not used, for example, when the display 1360 of the electronic device 1301 is placed on a desk upside down, the diode board 130 may deliver information such as time, message, etc. to the user.

According to various embodiments, when the display 1360 of the electronic device 1301 is disabled and a heart rate sensor or a fingerprint recognition sensor of the electronic device 1301 exposed to the outside of the exterior case 100 recognizes a user's heart rate or fingerprint, the diode board 130 may operate and may deliver a variety of information to the user.

When information regarding a posture of the electronic device 1301 or the fingerprint or heart rate of the user is recognized, the processor 1320 may process a signal received from the sensor module 1376, and may transmit a signal regarding control of the diode board 130 to the controller 172.

According to various embodiments, when the display 1360 of the electronic device 1301 is disabled or is maintained in the disabled state for a predetermined time, the diode board 130 may operate and may deliver information to the user. The state information of the display 1360 may be processed by the processor 1320 and a signal related to control of the diode board 130 may be transmitted to the controller 172.

Figure 15:
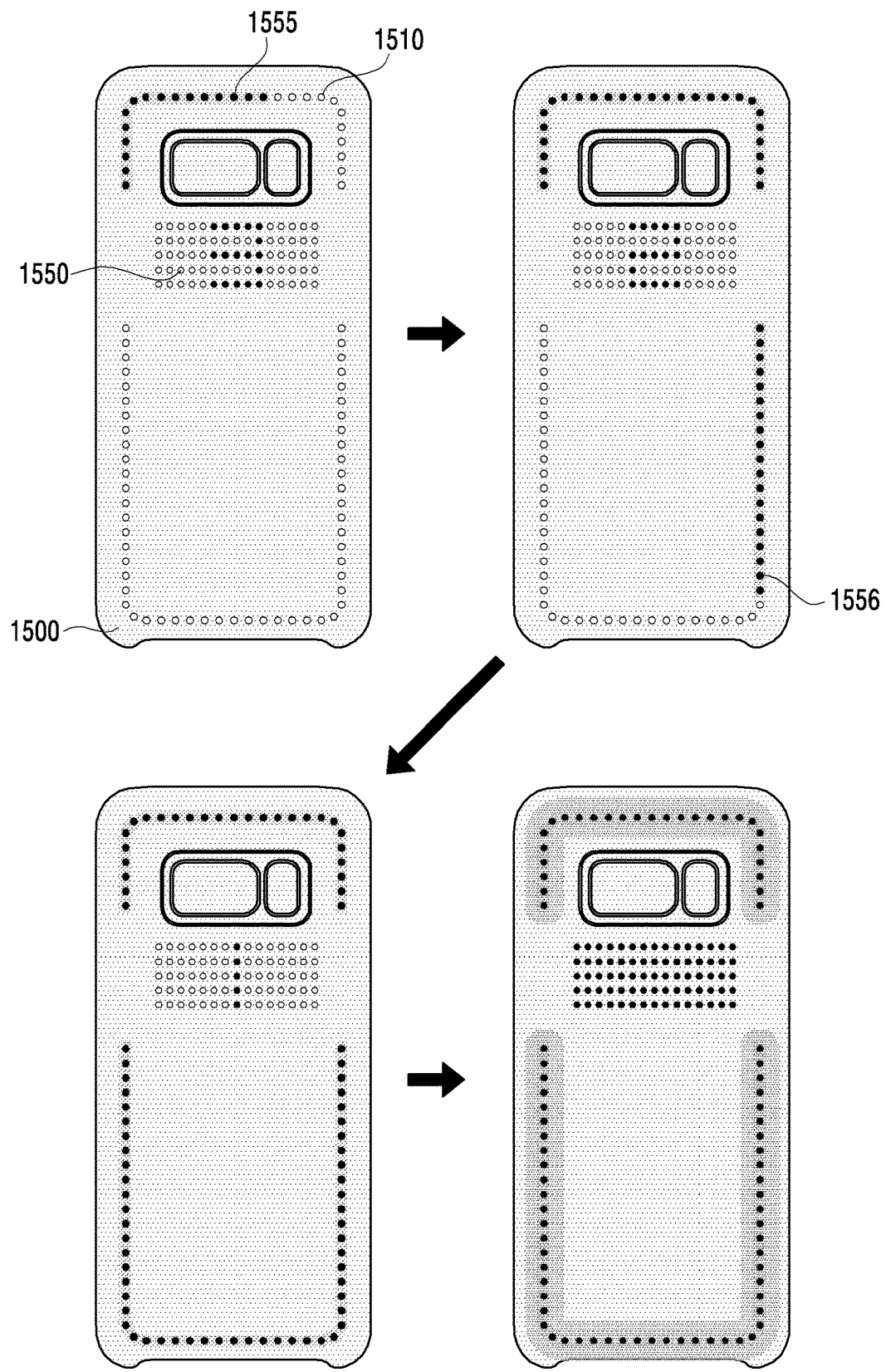
FIG. 15 is a view illustrating utilization of an exterior case according to various embodiments.

FIG. 15 is a view illustrating an example of utilization of an exterior case according to various embodiments.

Referring to FIG. 15, a rear surface of the exterior case 1500 may include a first diode panel 1550, a second diode panel 1555, and a third diode panel 1556. According to various embodiments, when a timer function is enabled by operating a camera application in the electronic device 1301, the first diode panel 1550, the second diode panel 1555, and the third diode panel 1556 may operate.

When the timer function is enabled, the processor 1320 may transmit a signal to the controller 172 to operate the first diode panel 1550, the second diode panel 1555, and the third diode panel 1556 as follows.

When the timer operates at time intervals of 3 seconds, the processor 1320 may transmit a signal to the controller 172 to display a time left on the first diode panel 1550. According to various embodiments, when 3 seconds are left, the first diode panel 1550 may display the number 3, and some diodes of the second diode panel 1555 may be turned on and emit light to the outside. When 2 seconds are left, the first diode panel 1550 may display the number 2 and the second diode panel 1555 and some diodes of the third diode panel 1556 may be turned on and emit light to the outside. When one second is left, the first diode panel 1550 may display the number 1, and the entire second diode panel 1555 and third diode panel 1556 may be turned on and emit light to the outside. When shooting is performed, all of the diode panels may be turned on and the second diode panel 1555 and the third diode panel 1556 may emit brighter light.

According to various embodiments, plural light emitting elements of the second diode panel 1555 and the second diode panel 1557 may be turned at a time according to their respective time, or the light emitting elements may be turned on continuously one by one as time is elapsed.

According to various embodiments as described above, an exterior case (for example, the exterior case 100 of FIG. 4) may include: a base (for example, the base 110 of FIG. 6) including an inner space (for example, the inner space 115 of FIG. 4) to receive an electronic device (for example, the electronic device 1301 of FIG. 13); a circuit board (for example, the circuit board 170 of FIG. 6) disposed on a first surface of the base and including a plurality of light emitting elements (for example, the light emitting elements 135 of FIG. 6) to emit light; and an outer skin (for example, the outer skin 150 of FIG. 6) configured to cover the base and the circuit board, and woven with wefts (for example, 10 of FIG. 1) and warps (for example, 20 of FIG. 1) allowing the emitted light to pass therethrough, and at least one of the weft and the warp may be formed with a TPEE coating thread including a core (for example, the core 31 of FIG. 2) formed with a transparent TPEE and a coating layer (for example, the coating layer 32 of FIG. 2) formed with PU and surrounding the core.

According to various embodiments, the weft and the warp may allow light to pass therethrough and may be stretched when a tension is applied thereto.

According to various embodiments, a transparent coating may be formed on a concavo-convex portion (for example, a concavo-convex portion 25 of FIG. 1) of the outer skin formed by weaving.

According to various embodiments, the exterior case may further include a holder configured to attach the circuit board and fastened to the base to seat the circuit board on the base.

According to various embodiments, the holder may include openings corresponding to the plurality of light emitting elements.

According to various embodiments, the warps may be configured in one color, and colors of the respective wefts may be selected based on a color of the outer skin that is visually recognized.

According to various embodiments, the colors of the respective wefts may be selected to become lighter or darker in sequence in at least an area of the outer skin.

According to various embodiments, the colors of the wefts may be selected to hide the circuit board.

According to various embodiments, the circuit board may include a communication device (for example, the communication device 171 of FIG. 6) to receive a signal of the electronic device, a memory (for example, 175 of FIG. 13) to store outer skin information including a color or a color density of the outer skin, and a controller (for example, the controller 172 of FIG. 6) operatively connected with the communication device and the memory.

According to various embodiments, the processor may select a color of the light emitting element based on a color or a color density of an area of the outer skin corresponding to a position of the light emitting element.

According to various embodiments, the processor may indicate information through the light emitting elements based on the received signal of the electronic device.

According to various embodiments, the exterior case may further include a coil (for example, the coil 173 of FIG. 6) electrically connected with the circuit board, and configured to generate a current through electromagnetic induction with the electronic device.

According to various embodiments, the base may include a second surface facing the first surface, and a third surface surrounding a space between the first surface and the second surface, and the first surface may be a cover that is disposed to be rotatable about one edge of the base, and opens and closes a front surface of the electronic device.

According to various embodiments, the exterior case may further include a cover holder configured to attach the circuit board and fastened to the first surface to seat the circuit board to the first surface.

According to various embodiments, the circuit board may be connected with a diode board including the light emitting elements, and an FPCB to supply a signal and a power.

According to various embodiments, an exterior case (for example, the exterior case 900 of FIG. 10) may include: a base (for example, the base 910 of FIG. 9) having a space to receive an electronic device (for example, the electronic device 1301 of FIG. 13); a cover (for example, the cover 915 of FIG. 10) disposed to be rotatable about one corner of the base to open and close a front surface of the electronic device; a plurality of light emitting elements (for example, the light emitting elements 935 of FIG. 10) disposed on an outer surface of the cover to emit light; a circuit board (for example, the circuit board 970 of FIG. 10) electrically connected with the plurality of light emitting elements and disposed on the base; and an outer skin (for example, the outer skins 950, 955 of FIG. 10) configured to cover the base and the cover, such that one edge of the base and one edge of the cover are disposed adjacent to each other, and woven with wefts (for example, 10 of FIG. 1) and warps (for example, 20 of FIG. 1) allowing the emitted light to pass therethrough, and at least one of the weft and the warp may be formed with a TPEE coating thread (for example, the wefts 10 and the warps 20 of FIG. 1) including a core formed with a transparent TPEE and a coating layer (for example, the coating layer 32 of FIG. 2) formed with PU and surrounding the core (for example, the core 31 of FIG. 2).

According to various embodiments, the circuit board may be connected with a diode board (for example, the diode board 930 of FIG. 1) including the light emitting elements, and an FPCB (for example, the FPCB 940 of FIG. 1) to supply a signal and a power.

According to various embodiments, the weft and the warp may allow light to pass therethrough and may be stretched when a tension is applied thereto.

According to various embodiments, the warps may be configured in one color, and colors of the respective wefts may be selected based on a color that is visually recognized.

According to various embodiments, the wefts positioned on an outside of the base may be formed in a color to hide the circuit board.

According to various embodiments, the circuit board may include a communication device (for example, the communication device 971 of FIG. 10) to receive a signal of the electronic device, a memory (for example, the memory 173 of FIG. 13) to store outer skin information including a color or a color density of the outer skin, and a controller (for example, the controller 972 of FIG. 13) operatively connected with the communication device and the memory.

According to various embodiments, the controller may adjust a color of light emitted from the light emitting element, based on a color or a color density of an area of the outer skin corresponding to a position of the light emitting element.

According to various embodiments, the exterior case may further include a coil (for example, the coil 973 of FIG. 10) formed on the base to generate a current through electromagnetic induction with the electronic device, and to supply the current to the circuit board.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the disclosure.

The invention claimed is:

1. An exterior case comprising:
a base comprising an inner space to receive an electronic device;
a circuit board disposed on a first surface of the base and comprising a plurality of light emitting elements to emit light;
an outer skin configured to cover the base and the circuit board, and woven with wefts and warps allowing the emitted light to pass therethrough; and
a plurality of light passing holes corresponding to the plurality of light emitting elements,
wherein at least one of the wefts and the warps is formed with a thermoplastic polyester elastomer (TPEE) coating thread comprising a core formed with a transparent TPEE and a coating layer formed with polyurethane (PU) and surrounding the core.

2. The exterior case of claim 1, wherein the wefts and the warps allow light to pass therethrough and are stretched when a tension is applied thereto.

3. The exterior case of claim 1, wherein a transparent coating is formed on a concavo-convex portion of the outer skin formed by weaving.

4. The exterior case of claim 1, further comprising a holder configured to attach the circuit board to the base to seat the circuit board on the base.

5. The exterior case of claim 4, wherein the holder comprises openings corresponding to the plurality of light emitting elements.

6. The exterior case of claim 1, wherein the warps are configured in one color, and colors of respective wefts are selected based on a color of the outer skin that is visually recognized.

7. The exterior case of claim 6, wherein the colors of the respective wefts are selected to become lighter or darker in sequence in at least an area of the outer skin.

8. The exterior case of claim 6, wherein the colors of the respective wefts are selected to hide the circuit board.

9. The exterior case of claim 1, wherein the circuit board comprises a communication device configured to receive a signal of the electronic device, a memory configured to store outer skin information including a color or a color density of the outer skin, and a controller operatively connected with the communication device and the memory.

10. The exterior case of claim 9, wherein the controller is configured to select a color of respective light emitting elements based on a color or a color density of an area of the outer skin corresponding to a position of the respective light emitting elements.

11. The exterior case of claim 9, wherein the controller is configured to indicate information through the light emitting elements based on the received signal of the electronic device.

12. The exterior case of claim 1, further comprising a coil electrically connected with the circuit board, and configured to generate a current through electromagnetic induction with the electronic device.

13. The exterior case of claim 1, wherein the base comprises a second surface facing the first surface, and a third surface surrounding a space between the first surface and the second surface, and
wherein the first surface is a cover that is disposed to be rotatable about one edge of the base, and opens and closes a front surface of the electronic device.

14. The exterior case of claim 13, further comprising a cover holder configured to attach the circuit board to the first surface to seat the circuit board to the first surface.

15. The exterior case of claim 13, wherein the circuit board is connected with a diode board comprising the light emitting elements, and a flexible printed circuit board (FPCB) to supply a signal and a power.

* * * * *